United States Patent [19]
Clarke et al.

[11] Patent Number: 5,373,926
[45] Date of Patent: Dec. 20, 1994

[54] INSULATED RAIL ELECTRIFICATION SYSTEM

[75] Inventors: Robin A. Clarke, Woodbridge; William R. Heil, Shelton; Robert S. Beale, Stratford, all of Conn.

[73] Assignee: Howell Corporation, Stratford, Conn.

[21] Appl. No.: 113,176

[22] Filed: Aug. 30, 1993

[51] Int. Cl.$^5$ .............................. B60M 1/34
[52] U.S. Cl. .................... 191/23 R; 191/30
[58] Field of Search .......... 191/22 R, 23 R, 25, 191/27, 23 A, 29 R, 30, 31, 33 R

[56] References Cited

U.S. PATENT DOCUMENTS

| | | | |
|---|---|---|---|
| 2,835,752 | 5/1958 | Anjeskey et al. | 191/23 A X |
| 2,958,743 | 11/1960 | Moore | 191/23 A |
| 2,969,438 | 1/1961 | Herrmann et al. | 191/23 A |
| 3,155,207 | 11/1964 | Blemly et al. | 191/23 A |
| 3,303,294 | 2/1967 | Howell, Jr. | 191/64 |
| 3,399,281 | 8/1968 | Corl | 191/23 R |
| 3,489,981 | 1/1970 | Corl et al. | 191/23 R X |
| 3,506,099 | 4/1970 | Howell, Jr. | 191/23 |
| 3,525,823 | 8/1970 | Howell, Jr. | 191/59.1 |
| 3,649,779 | 3/1972 | Howell, Jr. | 191/45 A |
| 3,902,579 | 9/1975 | Howell, Jr. | 191/29 |
| 3,995,725 | 12/1976 | Howell, Jr. | 191/23 A |
| 3,998,306 | 12/1976 | Howell, Jr. | 191/23 R |
| 4,016,961 | 4/1977 | Howell, Jr. | 191/23 A |
| 4,106,599 | 8/1978 | Howell, Jr. | 191/27 |
| 4,155,434 | 5/1979 | Howell, Jr. | 191/22 R |
| 4,163,485 | 8/1979 | Howell, Jr. | 191/40 |
| 4,412,107 | 10/1983 | Hillmann | 191/30 X |
| 4,704,502 | 11/1987 | Pelletier | 191/23 A |

FOREIGN PATENT DOCUMENTS

| | | | |
|---|---|---|---|
| 673122 | 10/1963 | Canada | 191/23 A |
| 2068317 | 8/1981 | United Kingdom | 191/23 A |

Primary Examiner—Michael S. Huppert
Assistant Examiner—Scott L. Lowe
Attorney, Agent, or Firm—H. Gibner Lehmann; K. Gibner Lehmann

[57] ABSTRACT

An electrical rail conductor assemblage for an insulated electrification system, including an elongate electrically-conducting rail having a longitudinal groove for receiving a cooperable collector shoe and for guiding it for travel along the rail. The rail has opposite wall portions which border the groove. The wall portions have thin wall sections with rounded longitudinal edges that constitute the mouth of the groove of the rail. The rail is covered by an essentially tubular, insulating, hollow, resilient and rigid cover member enveloping essentially all portions of the rail except for the mouth of the groove thereof. The cover member has a longitudinal cut which registers with the mouth of this groove, and curved, longitudinally-extending snap-on retainer portions that extend along the cut and are adapted to snap over the rounded longitudinal edges of the rail. These retainer portions extend in a circumferential direction through substantially a full semi-circle. The retainer portions further have exterior longitudinal flanges which constitute offset extensions of the opposite wall portions of the resilient cover member, to thus minimize access to the metal of the rail, and reduce the chance of inadvertent electric shock from an electrically live rail.

2 Claims, 1 Drawing Sheet

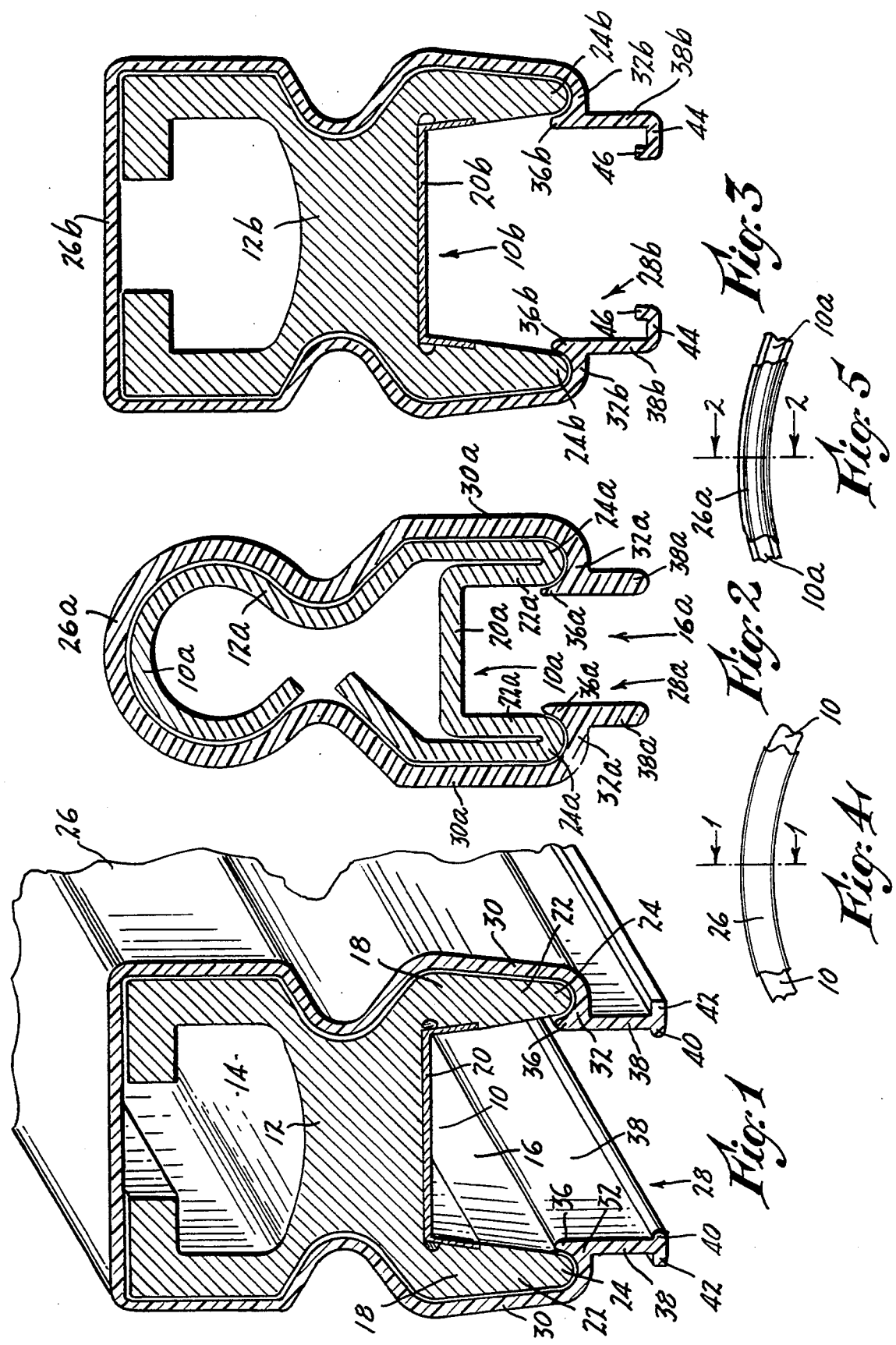

5,373,926

INSULATED RAIL ELECTRIFICATION SYSTEM

BACKGROUND OF THE INVENTION

1. Field of the Invention

This invention relates generally to rail electrification systems, and more particularly to insulating jackets or cover members that surround the conductive metal rails of such systems.

2. Description of the Related Art Including Information Disclosed Under 37 CFR §§1.97–1.99

The following patents are of interest:

U.S. Pat. Nos.:

| | | |
|---|---|---|
| 3,303,294 | 3,506,099 | 3,525,823 |
| 3,649,779 | 3,902,579 | 3,995,725 |
| 3,998,306 | 4,016,961 | 4,106,599 |
| 4,155,434 | 4,163,485 | |

U.S. Pat. Nos. 3,998,306 and 4,016,961 illustrate typical rail constructions. Rails of this general type are employed in industrial cranes, conveyers, hoists, monorail systems, automated storage and retriever systems, and Port Authority Equipment, as well as being used in various other applications.

The constructions disclosed in the patents of the previous paragraph feature an electrically conductive rail member (34) preferably constituted of aluminum, having spaced flange portions (40) and a web portion (42). A flat contact strip (46) is fitted between the flange portions, as shown. The contact strip (46) is preferably stainless steel, and is both wear resistant and sufficiently electrically conductive so as not to introduce significant voltage drop at the contact shoe (16) with which the rail is used.

Such rails are typically suspended by means of mounting clamps (12, 14), and an insulating jacket (58) surrounds the rail and provides the required electrical isolation between it and the clamps (12, 14).

Modified rail structures incorporating insulating jackets are illustrated in U.S. Pat. Nos. '599; '485; '725; '823; '779; '099; and '294.

A rail assemblage of a type incorporating a plastic or glass insulating hanger is illustrated in U.S. Pat. No. '579.

U.S. Pat. No. 4,155,434 discloses a 3-phase rail electrification system employing an insulating support (22) for mounting a plurality of rails.

SUMMARY OF THE INVENTION

The present invention constitutes an improvement over the rail constructions noted above in that a more secure retention of the insulating jacket or cover member is realizeable, due to a close conformity between the inner surface of the jacket or cover member and the outer surface of the metal rail, such conformity being obtained by virtue of cooperable essentially semi-circular (semi-cylindrical) surfaces on the metal rail and cover member, such that the latter hugs and closely confines the metal rail at the location of such semi-circular surfaces.

The improved retention as provided by the invention, minimizes inadvertent separation of the cover member from the metal rail, which is particularly important where the rail is disposed in a curved path, and where buckling of the cover member might otherwise occur.

The object of the present invention is thus to provide an improved rail and cover member which are both simple in their structures, easily assembled to one another preferably by means of a snap fit, and thereafter securely retained against inadvertent separation.

A related object of the invention is to provide an improved rail and cover member as above set forth, which more effectively hinders inadvertent contact with the metal rail by the fingers of an installer or technician, at the location of the mouth of the rail, so as to minimize potential shock hazards resulting from such inadvertent contact, as by an electrically live rail.

Still another object of the invention is to provide an improved rail and cover member of the kind indicated, which is adaptable to conventional supporting means, including existing hanger clips, support fixtures, and insulators of plastic, glass or the like, all of known configuration.

In accomplishing the above objects the invention provides an electrical rail conductor assemblage for an insulated electrification system, comprising in combination an elongate electrically-conducting metal rail having a longitudinal groove for receiving a cooperable collector shoe and for guiding the same for travel along the rail, and an essentially tubular, insulating, hollow, resilient and rigid cover member enveloping a substantial portion of the rail. The rail has opposite wall portions which border its groove, these wall portions comprising thin wall sections which have rounded longitudinally extending edges that constitute the mouth of the groove of the rail. The cover member envelops essentially all of the rail except for the mouth of the rail's groove. The rigid cover member has a longitudinal cut in its wall throughout its length, the cut registering with the mouth of the groove of the rail and bordering two opposite wall portions of the cover member which have and which support curved, longitudinally-extending snap-on retainer portions that extend along the cut of the cover member and are adapted to snap over the rounded longitudinal edges of the rail. The retainer portions closely fit the rounded longitudinal edges of the rail and extend in a circumferential direction through substantially a semi-circle, or half-cylinder. The retainer portions have innermost edges of reduced thickness which are located inside the groove of the rail, the innermost edges constituting oppositely located shoulders which face into the groove of the rail. The retainer portions further have exterior longitudinal outwardly projecting flanges which constitute laterally offset extensions of the opposite wall portions of the resilient cover member that support the retainer portions.

The arrangement is such that the cover member effectively hugs the electrically conducting metal rail, by virtue of the close fit between its retainer portions and the rounded longitudinal edges of the rail. There results an improved retention of the cover member, and reduced likelihood of contact of the rail by the fingers of service or maintenance personnel working on the equipment with which the rail is associated.

Other features and advantages will hereinafter appear.

BRIEF DESCRIPTION OF THE DRAWINGS

FIG. 1 is a view, partly in perspective and partly in transverse section, of an improved rail construction in accordance with the present invention. The section is taken on the line 1—1 of FIG. 4.

FIG. 2 is a transverse section of a modified rail construction, constituting another embodiment of the invention. The section is taken on the line 2—2 of FIG. 5.

FIG. 3 is a transverse section of a further modified rail construction, constituting still another embodiment of the invention.

FIG. 4 is a fragmentary top plan view of the rail of FIG. 1, the rail being shown extending along a curved path, and FIG. 5 is a fragmentary top plan view of the rail of FIG. 2, disposed along a curved path.

DESCRIPTION OF THE PREFERRED EMBODIMENTS

Referring first to FIG. 1, there is illustrated an electrically conducting rail generally designated by the numeral 10, preferably constituted of aluminum and having an elongate metal body 12 with an upper channel 14 for securing the rail to a hanger (not shown), which can be of a type similar to that of U.S. Pat. No. 4,016,961. The rail has a lower channel in the form of a longitudinal groove 16, for receiving a cooperable collector shoe (not shown) which also can be of a type illustrated in the above identified patent.

The disclosure of U.S. Pat. No. 4,016,961 is hereby incorporated, by reference, in the present application.

The rail 10 has opposite wall portions 18 which border the longitudinal groove 16, a substantially flat contact wear strip 20, preferably constituted of stainless steel, for engagement by the contact shoe (not shown) with which the rail is to be used. The rail further has thin side wall sections 22 which have longitudinal edges 24 that constitute the mouth of the groove 16. There is provided an essentially tubular, insulating, hollow, resilient and rigid cover member or jacket 26 enveloping portions of the rail body 12, except at the area at the mouth of the groove 16 thereof. The cover member 26 is preferably a rigid PVC extrusion, which will not deform substantially under the pressure of a clamp, but which can stretch to a certain extent under the action of a stretching force.

The rigid cover member 26 has a longitudinal cut 28 in its wall, throughout its length. The cut 28 registers with the mouth of the groove 16 of the rail body 12 and is disposed inwardly of two opposite wall portions 30 of the cover member 26.

In accordance with the present invention, the longitudinal edges 24 of the rail are rounded in cross-section, and the wall portions 30 of the cover member 26 have cooperable curved, longitudinally-extending snap-on retainer portions 32 that extend along the cut 28 of the cover member and which are adapted to snap over the rounded longitudinal edges 24 of the rail body 12. According to the invention, the retainer portions 32 of the cover member 26 closely fit these edges 24, and extend in a circumferential direction through substantially a full semi-circle or half-cylinder, for reasons later explained. The retainer portions 32 of the cover member 26 have innermost edges 36 of reduced thickness, which are located inside of the groove 16 of this rail body 12, and the innermost edges 36 constitute oppositely located shoulders which face into the groove 16 of this rail body 12. The retainer portions 32 further have exterior longitudinal flanges 38 which constitute laterally and inwardly offset extensions of the opposite wall portions 30 of the cover member 26 that support these retainer portions 32.

According to the invention, the snap-on retainer portions 32 of the rigid cover member 26 closely fit and lock onto the rail 12 and especially by virtue of their curved cross sectional configuration by which they extend through the semi-circle referred to above. The retainer portions 32 function as close-fitting hooks which tend to securely hold the cover 26 to the rail 10, 12 at all times. The two opposite wall portions 30 of the cover member 26 can be manually flexed by a separating pressure exerted on the exterior flanges 38, thereby to swing the retainer portions 32 out of contact with the rail body 12 for facilitating removal of the cover member 26, should this become necessary.

It is to be noted that by the invention, the cover member 26 closely fits the exterior of the rail body 12 to enable the assemblage of cover member 26 and rail body 12 to be flexed as a unit without separation of the cover member 26 from the rail body 12 when the assemblage is formed into a curved configuration as in FIG. 4. The exterior flanges 38 of the cover member 26 have first and second sets of shoulders 40, 42 extending along their free edges, the shoulders of said sets being disposed in back-to-back relation to each other.

Another embodiment of the invention is shown in FIG. 2, wherein like components have been assigned similar numbers with the addition of the suffix "a". There is illustrated a modified metal rail 10a, comprising a formed sheet metal body 12a, having an integral flat slide contact surface 20a, and juxtaposed longitudinally-extending edges 22a, forming a groove 16a to receive a contact shoe (not shown). By the invention, the rail body 12a has rounded longitudinal edges 24a which border the groove 16a in the rail, and a cover member designated 26a is provided. The cover member 26a has a longitudinal cut 28a in its wall throughout its length. The cut 28a registers with the mouth of the groove 16a of the rail body 12a and borders two opposite wall portions 30a of the cover member 26a.

By the invention, the wall portions 30a of the cover member have cooperable curved, longitudinally-extending snap-on retainer portions 32a that extend along the cut 28a of the cover member 26a and are adapted to snap over the rounded longitudinal edges 24a of the rail body 12a. The retainer portions 32a of the cover member 26a closely fit these edges 24a, and extend in a circumferential direction through substantially a semi-circle, as in the first embodiment. The retainer portions 32a of the cover member 26a have innermost edges 36a of reduced or tapered thickness, which are located inside of the groove 16a of the rail body 12, and the innermost edges 36a constitute oppositely located shoulders which face into the groove 16a of the rail body 12a. The retainer portions 32a further have exterior longitudinal flanges 38a which constitute laterally and inwardly offset extensions of the opposite wall portions 30a of the cover member 26a that support the retainer portions 32a.

Still another embodiment of the invention is shown in FIG. 3, wherein like components have been assigned similar numbers with the addition of the suffix "b". There is illustrated a rail 10b with body portion 12b having a configuration similar to that of FIG. 1, including a flat contact strip 20b, and a semi-rigid cover member 26b having retainer portions 32b with edges 36b that extend along a cut 28b of the cover member 26b and which snap over the rounded longitudinal edges 24b of the rail body 12b. At the lowermost ends of the flanges 38b, there are coextensive transverse shoulders 44 extending inward and terminating in upwardly extending flanges 46, the free longitudinal edges of which face the inside of the groove 16b of the rail body 12b.

The arrangements of FIGS. 1, 2 and 3 all result in an especially snug retention of the cover member on the metal rail body, even when the rail is disposed along a curved path as indicated in either FIG. 4 or FIG. 5. The cover member effectively hugs the rail by virtue of the cooperable semi-circular engaging surfaces on the longitudinal edges of the rail body and on the retainer portions 32, 32a, 32b, respectively of the cover member 26, 26a, 26b, respectively.

In all of the disclosed embodiments, the spacing between the exterior longitudinal flanges 38, 38a, 38b, respectively is preferably sufficiently small to prevent access to all portions of the conducting rail body 12, 12a, 12b, respectively by the fingers of operating personnel and/or service technicians, thereby minimizing the possibility of inadvertent shock from an electrified rail. The stiffness of the cover member is chosen so that little yielding will occur under manual pressure, as of a type which would be applied to the cover member adjacent its cut, by the fingers of such personnel. An important safety feature is thus provided by the present invention, minimizing potential shock hazards which otherwise might be present during maintenance or test of an installed rail system of this type.

The disclosed rail conductor assemblages are thus seen to constitute an important advance and improvement in the field of rail electrification systems.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. An electrical rail conductor assemblage for an insulated electrification system, comprising in combination:
   a) an elongate electrically-conducting rail having a longitudinal groove for receiving a cooperable collector shoe and for guiding the same for travel along the rail,
   b) said rail having opposite wall portions which border the groove thereof,
   c) said wall portions of the rail comprising thin wall sections which have rounded longitudinally extending edges that constitute the mouth of the groove of the rail,
   d) an essentially tubular, insulating, hollow, resilient and rigid cover member enveloping portions of said rail except for the mouth of the groove thereof,
   e) said rigid cover member having a longitudinal cut in its wall throughout the length of the cover member, said cover member having two opposite wall portions, and said cut registering with the mouth of the groove of the rail and bordering the two opposite wall portions of the cover member which have and support curved, longitudinally-extending snap-on retainer portions that extend along the said cut of the cover member and are adapted to snap over the rounded longitudinal edges of the rail,
   f) said retainer portions closely fitting said rounded longitudinal edges of the rail and extending in a circumferential direction through substantially a semi-circle,
   g) said retainer portions having innermost edges of reduced thickness which are located inside the said groove of the rail, said innermost edges constituting oppositely located shoulders which face into the said groove of the rail, and
   h) said retainer portions further having exterior longitudinal flanges which constitute offset extensions of the said opposite wall portions of the resilient cover member that support the retainer portions,
   i) said exterior flanges having a set of shoulders extending along their free edges and facing toward the groove of the rail,
   j) said exterior flanges having another set of shoulders extending along their free edges, both of said sets of shoulders being disposed in back-to-back relation with each other.

2. An electrical rail conductor assemblage for an insulated electrification system, comprising in combination:
   a) an elongate electrically-conducting rail having a longitudinal groove for receiving a cooperable collector shoe and for guiding the same for travel along the rail,
   b) said rail having opposite wall portions which border the groove thereof,
   c) said wall portions of the rail comprising thin wall sections which have rounded longitudinally extending edges that constitute the mouth of the groove of the rail,
   d) an essentially tubular, insulating, hollow, resilient and rigid cover member enveloping portions of said rail except for the mouth of the groove thereof,
   e) said rigid cover member having a longitudinal cut in its wall throughout the length of the cover member, said cover member having two opposite wall portions, and said cut registering with the mouth of the groove of the rail and bordering the two opposite wall portions of the cover member which have and support curved, longitudinally-extending snap-on retainer portions that extend along the said cut of the cover member and are adapted to snap over the rounded longitudinal edges of the rail,
   f) said retainer portions closely fitting said rounded longitudinal edges of the rail and extending in a circumferential direction through substantially a semi-circle,
   g) said retainer portions having innermost edges of reduced thickness which are located inside the said groove of the rail, said innermost edges constituting oppositely located shoulders which face into the said groove of the rail, and
   h) said retainer portions further having exterior longitudinal flanges which constitute offset extensions of the said opposite wall portions of the resilient cover member that support the retainer portions,
   i) said exterior flanges having a set of shoulders extending along their free edges and facing toward the groove of the rail,
   j) said exterior flanges having another set of shoulders extending along their free edges, both of said sets of shoulders being disposed in back-to-back relation with each other to provide stiffening to the flanges, in the manner of an I-beam.

* * * * *